United States Patent Office.

JOHN N. KATZENMAYER, OF NEW YORK, N. Y., ASSIGNOR TO HIMSELF AND WM. P. MOLO, OF SAME PLACE.

IMPROVEMENT IN THE PREPARATION OF THE ROOTS OF PLANTS FOR USEFUL PURPOSES.

Specification forming part of Letters Patent No. 40,143, dated September 29, 1863.

*To all whom it may concern:*

Be it known that I, JOHN N. KATZENMAYER, of New York, in the county and State of New York, have made a new and useful discovery or invention, whereby the roots of certain plants never heretofore used are rendered useful and particularly available for the manufacture of brushes, besoms, and other like implements; and I hereby declare that the following is a full and exact description of the same.

The root of certain plants or grass I have discovered to possess, if properly prepared, certain properties which renders it peculiarly fit or adapted to the manufacture of brushes or besoms. The root I have found is composed of tough filaments more or less fine, and when properly treated to free it of its skin, to expel the moisture absorbed from the soil, and to straighten it, it acquires flexibility and springiness, which are so desirable in a good brush. Moreover, I have found that these roots may be bleached or colored, so as to give them a pleasing appearance, and thereby enhance their commercial value.

To enable others to use my invention, I shall now proceed to describe the manner in which the same is or may be carried into effect.

I use the root of the *Andropogon gryllus*, *Andropogon macrourus*, *Andropogon Virginicus*, as well as many others whose names are not known either in botanic or in vulgar language. Some are called by many different names, according to the part of country where they happen to grow. In the State of New York, for instance, there are some such grasses that are known under the name of "wild Indian grass," "turkey-beard," "wild blue bent," "salt-grass," which in Delaware and Maryland are called "seage," "nut-grass," and "Indian grass," whereas in South Carolina they are called "broom-straw." In fact, these different species of plants or grasses whose roots I have discovered how to render useful have been entirely unnoticed by the practical farmer as well as by the professional botanist, so much so that it is difficult to find persons of different localities that will call them by the same name, and that many are known under no name at all. Until the present time roots available for the purpose of making brushes have been found by me in the States of New Jersey, Maryland, Delaware, and South Carolina; but from experience I may say that such may be found in some portion of almost every State and Territory of the United States. The ground in which they grow is generally poor, sandy, and entirely worthless for cultivation, and when they happen to grow in cultivated fields they are a great pest and a nuisance. The farther I proceed in my researches the more I find different varieties, making it impossible to limit the quantity of species of grasses or plants the roots of which may be useful for my purpose, and having no botanic or even a vulgar name. The roots may be dug out of the ground by means of spades, shovels, pick-axes, hoes, or any other like instrument. The digging must be done very carefully around the bush or bushes at a distance of at least half a foot from the stem, in order not to cut the roots, which spread out in all directions and at different depths under the ground. When the bushes and roots are out of the ground, they are shaken to free them from the earth, cut off, and left to dry. The roots may be prepared immediately after they have been dug out, or may be prepared at any time afterward.

The husking, shelling, and preparing is done by rubbing or frictioning the roots on a board, or between two boards, or simply between the hands, and by shaking until the husk or shell or skin and the earth, sand, and all foreign substances are removed. The roots are then washed in clean cold water, which done, they are left to dry either in the open air or by artificial means.

The husking, shelling, and preparing as above may be done by machinery. After the roots are sufficiently cleansed and dried, they may be assorted, and those that are straight may be bound into brushes, while those that are entangled or crooked should be submitted to a combing or straightening process.

In most instances the root, previous to being washed, is of a dark or dirty appearance. To impart to it a bright straw color it is sometimes only necessary to repeatedly wash it. When the soil in which the plant grows is such as to destroy the natural bright yellow of the root, it becomes necessary to artificially dye or color it. I accomplish this by placing the root to be dyed or colored in a case, through which I pass the vapors of sulphur.

Having thus fully described my invention, I claim—

1. As a new manufacture, preparing or treating and utilizing, substantially in the manner herein described, the root of plants or shrubs of the character hereinbefore referred to, for the purpose of making it available for the production of brushes, besoms, and other like implements.

2. As a new article of manufacture, brushes, besoms, and other like implements made, substantially in the manner hereinbefore described, of the root of plants or shrubs of the character hereinbefore referred to.

In testimony whereof I have signed my name to this specification before two subscribing witnesses.

JOHN N. KATZENMAYER.

Witnesses:
H. K. MOORE,
A. POLLOK.